(No Model.)
L. BECKER.
MACHINE FOR CUTTING OFF THE SOILED BUTTS OF GRAIN STALKS.
No. 362,244. Patented May 3, 1887.
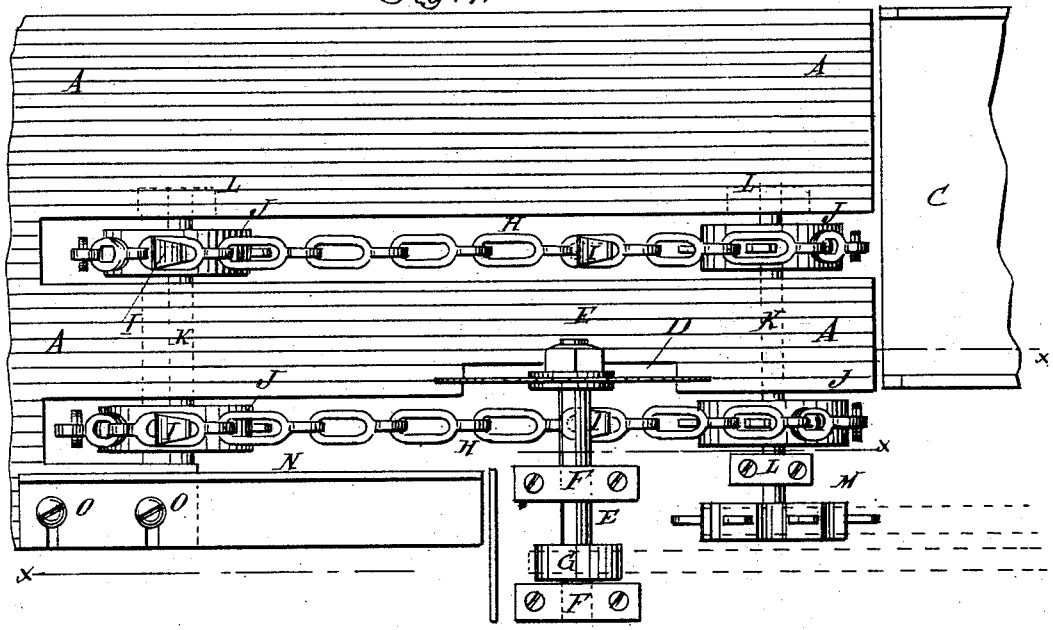
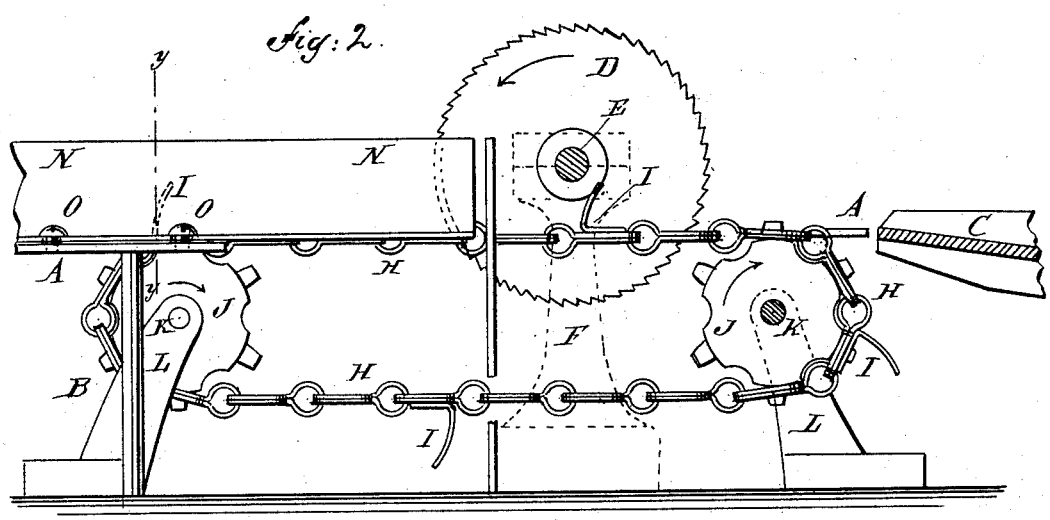
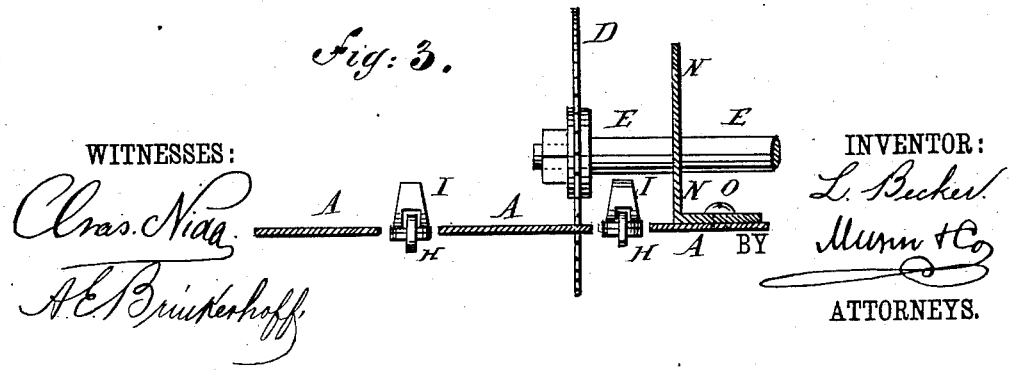
WITNESSES:
INVENTOR:
L. Becker
BY Munn & Co.
ATTORNEYS.

UNITED STATES PATENT OFFICE.

LOTHAR BECKER, OF GALVESTON, TEXAS.

MACHINE FOR CUTTING OFF THE SOILED BUTTS OF GRAIN-STALKS.

SPECIFICATION forming part of Letters Patent No. 362,244, dated May 3, 1887.

Application filed July 22, 1886. Serial No. 208,730. (No model.)

*To all whom it may concern:*

Be it known that I, LOTHAR BECKER, of Galveston, in the county of Galveston and State of Texas, have invented new and useful Improvements in Machines for Cutting Off the Soiled Butts of Grain-Stalks, of which the following is a full, clear, and exact description.

Reference is to be had to the accompanying drawings, forming a part of this specification, in which similar letters of reference indicate corresponding parts in all the figures.

Figure 1 is a plan view of my improved machine, part of the feed-table being broken away. Fig. 2 is a side elevation of the same, partly in section, through the line $x\ x\ x$, Fig. 1, and part being broken away. Fig. 3 is a sectional end elevation of a part of the same, taken through the line $y\ y$, Fig. 2.

In the black waxy wheat lands of Texas, if the soil is wet when the grain is shocked, or if it rains while the grain is standing in shocks, the butts of the stalks become coated or spattered with soil, which adheres to them, and when the grain is thrashed this adhering soil is broken into lumps about the size of wheat-kernels, and being a little heavier than the wheat-kernel it cannot be removed by the grain-separators, but goes with the grain to the flouring-mills and ruins the flour, making it unmerchantable.

The object of my invention is to provide machines for cutting off the soiled butts of grain-stalks before they enter the thrashing-machine, and thus prevent the soil from entering and passing through the thrashing-machines with the grain.

The invention consists in the construction and combination of the various parts of the machine, as will be hereinafter fully described and then claimed.

A is the feed-table of the machine, which is supported by standards B, or a suitable frame, in such a position that the head parts of the grain-stalks will pass directly from the delivery end of the said feed-table to the feed-table C of a thrashing-machine.

The feed-table A is slotted or recessed to receive the lower part of the saw D, the mandrel E of which revolves in bearings in standards F, or other suitable supports. To the saw-mandrel E is attached a pulley, G, to receive a belt from the cylinder-shaft of the thrashing-machine, so that the said saw can be driven at the requisite speed.

The feed-table A is slotted in its middle part and slotted or recessed near or at one edge to receive the parallel endless chains H, the upper parts of which are flush with the feed-table A, and which are provided with curved arms I, to take hold of the grain-stalks and carry them forward to the saw and carry the head parts of the said stalks to the feed-table C of the thrashing-machine, the cut off soiled butts of the said stalks falling to the ground.

The endless chains H pass around chain-wheels J, the shafts K of which revolve in bearings in standards L, or other suitable supports. One of the shafts K is extended, and to it is attached a chain-wheel, M, to receive an endless chain from the elevator-shaft of the thrashing-machine, or some other part of the driving mechanism of the said thrashing-machine that has the necessary slowness of motion.

N is a gage-plate, the lower part of which is bent outward at right angles, and is slotted to receive the screws or bolts O, that secure it to the table A. By loosening the said screws or bolts the gage-plate N can be moved out or in, according as more or less has to be cut from the butts of the grain-stalks to remove the soiled parts of the said stalks.

The grain can be fed to the endless chains H to be carried to the saw in bundles, or the bands can be cut and the grain fed loose to the said endless chains. By removing the useless butts of the stalks before feeding the latter to the thrashing-machine the capacity of the same will be greatly increased and less power will be required in treating the grain-stalks.

Having thus fully described my invention, I claim as new and desire to secure by Letters Patent—

A machine for cutting off the soiled butts of grain-stalks, comprising the table A, slotted in its middle part and slotted and recessed at or near one edge, the parallel endless bundle-carrying chains working in said slots and having arms I, the chain-wheels J, the shafts K thereof and their supports, the circular saw D in the recess at the edge of the table, the mandrel E, and the gage-plate N, substantially as set forth.

LOTHAR BECKER.

Witnesses:
GUS. REYMERSHOFFER,
J. C. KIRSCHNER.